(12) United States Patent
Lai et al.

(10) Patent No.: US 9,967,410 B2
(45) Date of Patent: May 8, 2018

(54) MOBILE DEVICE, COMPUTER DEVICE AND IMAGE CONTROL METHOD THEREOF FOR EDITING IMAGE VIA UNDEFINED IMAGE PROCESSING FUNCTION

(71) Applicant: ASUSTeK COMPUTER INC., Taipei (TW)

(72) Inventors: Yi-Chi Lai, Taipei (TW); Kuan-Ying Huang, Taipei (TW); Bo-Cheng Chen, Taipei (TW); Wan-Ya Chen, Taipei (TW); Cheng-An Chiu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days. days.

(21) Appl. No.: 14/722,160

(22) Filed: May 27, 2015

(65) Prior Publication Data

US 2015/0350466 A1 Dec. 3, 2015

Related U.S. Application Data

(60) Provisional application No. 62/004,224, filed on May 29, 2014.

(30) Foreign Application Priority Data

Apr. 23, 2015 (TW) .............................. 104113024 A

(51) Int. Cl.
*H04N 5/225* (2006.01)
*H04N 1/00* (2006.01)

(52) U.S. Cl.
CPC ..... *H04N 1/00244* (2013.01); *H04N 1/00127* (2013.01); *H04N 1/00172* (2013.01); *H04N 1/00204* (2013.01)

(58) Field of Classification Search
CPC ........... H04N 1/00244; H04N 1/00127; H04N 1/00172; H04N 5/23203; H04N 5/232;
(Continued)

(56) References Cited

U.S. PATENT DOCUMENTS 7,702,133 B2 * 4/2010 Muramatsu ............... B60R 1/00
382/104
8,432,456 B2 4/2013 Armstrong
(Continued)

FOREIGN PATENT DOCUMENTS

| TW | 201019717 | 5/2010 |
|---|---|---|
| TW | 201207626 | 2/2012 |
| TW | I419047 | 12/2013 |

*Primary Examiner* — Daniel M Pasiewicz
*Assistant Examiner* — Selam Gebriel
(74) *Attorney, Agent, or Firm* — JCIPRNET

(57) ABSTRACT

An image control method, applied to a mobile device including a camera service platform, wherein the mobile device complies an image transmission protocol and establishes an event queue and an extension unit according to the image transmission protocol, wherein the image control method comprises: receiving at least one control parameter of an image processing function of a camera service platform; generating a control item of the image processing function according to the controlling parameter; mapping the control item to a database and transmitting a notification including the control item to a computer device to transmit an image between the computer device and the mobile device.

14 Claims, 6 Drawing Sheets

(58) Field of Classification Search
CPC ........... H04N 5/23206; H04N 1/00204; H04N 2201/0084
See application file for complete search history.

(56) References Cited

U.S. PATENT DOCUMENTS

| | | | |
|---|---|---|---|
| 8,466,974 B2 | 6/2013 | Yu et al. | |
| 2007/0011711 A1* | 1/2007 | Wolf | G06K 9/00342 725/105 |
| 2007/0257934 A1* | 11/2007 | Doermann | G06K 9/36 345/606 |
| 2009/0164655 A1* | 6/2009 | Pettersson | H04L 65/4015 709/231 |
| 2009/0300122 A1* | 12/2009 | Freer | G06K 9/4604 709/206 |
| 2010/0118153 A1 | 5/2010 | Yu | |
| 2010/0118169 A1 | 5/2010 | Yu et al. | |
| 2011/0310257 A1* | 12/2011 | Armstrong | H04N 1/00212 348/207.1 |
| 2012/0033101 A9 | 2/2012 | Yu et al. | |
| 2012/0214451 A1* | 8/2012 | Richardson | H04W 12/12 455/414.1 |
| 2015/0350518 A1* | 12/2015 | Lin | H04N 21/4222 725/110 |

* cited by examiner

MOBILE DEVICE, COMPUTER DEVICE AND IMAGE CONTROL METHOD THEREOF FOR EDITING IMAGE VIA UNDEFINED IMAGE PROCESSING FUNCTION

CROSS-REFERENCE TO RELATED APPLICATION

This application claims the priority benefit of U.S. provisional application Ser. No. 62/004,224, filed on May 29, 2014 and Taiwan application serial No. 104113024, filed on Apr. 23, 2015. The entirety of each of the above-mentioned patent applications is hereby incorporated by reference herein and made a part of specification.

BACKGROUND OF THE INVENTION

Field of the Invention

The disclosure relates to an image control method and, more particularly, to an image control method for electronic devices.

Description of the Related Art

Nowadays, a mobile device usually equips with a camera, and varies applications cooperating with the camera are thus developed, such as applications utilizing USB video class (UVC) to transmit images between a camera of the mobile device and a desktop computer.

Conventionally, an extension unit as defined by UVC in the mobile device should be supported by the computer device since UVC does not support the control items that do not originally exist in the mobile device. As a result, the general software developers cannot control to edit the captured image via a self-defined image processing function.

BRIEF SUMMARY OF THE INVENTION

An image control method, applied to a mobile device with a camera service platform, the mobile device complies with an image transmission protocol and establishes an event queue and an extension unit according to the image transmission protocol, wherein the image control method comprises: receiving at least one control parameter of an image processing function of the camera service platform; generating a control item of the image processing function according to the control parameter; mapping the control item to a data base; and transmitting a notification including the control item to a computer device to transmit an image between the computer device and the mobile device.

A mobile device including a camera service platform is provided. The mobile device includes a storage unit and a processing unit. The storage unit stores a plurality of modules. The processing unit is coupled to the storage unit, and the processing unit accesses and executes the plurality of modules. The plurality of modules include an algorithm determining module and a generating module. The algorithm determining module receives at least one control parameter of an image processing function of the camera service platform. The generating module generates a control item of the image processing function according to the control parameter, maps the control item to a database, and transmits a notification including the control item to a computer device which has image transmission with the mobile device.

An image control method applied to a computer device is provided. The image control method includes the steps of: receiving a notification including a control item, wherein the notification is corresponding to an image processing function of a camera service platform, and the control item event is corresponding to a control item which is generated according to the image processing function; generating a control interface for controlling the image processing function to edit an image in respond to the notification; generating a control signal according to a control operation when the control interface receives the control operation corresponding to the image processing function; transmitting the control signal. The control signal includes at least one actual control parameter related to the control operation.

A computer device is provided. The computer device includes an extension processing module an application interface module. The extension processing module receives a notification including a control item event, wherein the notification is corresponding to an image processing function of a camera service platform, and the control item event is corresponding to the control item generated according to the image processing function. The application interface module with a control interface for controlling the image processing function to edit an image in respond to the notification. The extension processing module generates a control signal according to a control operation when the control interface receives the control operation corresponding to the image processing function, and transmits the control signal. The control signal includes at least one actual control parameter related to the control operation.

In sum, the image control method and the mobile device make the image processing function of the new registered camera service platform show as the control item of the data structure which conforms to the image transmission protocol, and then the computer device generates the corresponding control interface according to the control item.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Figure 1:
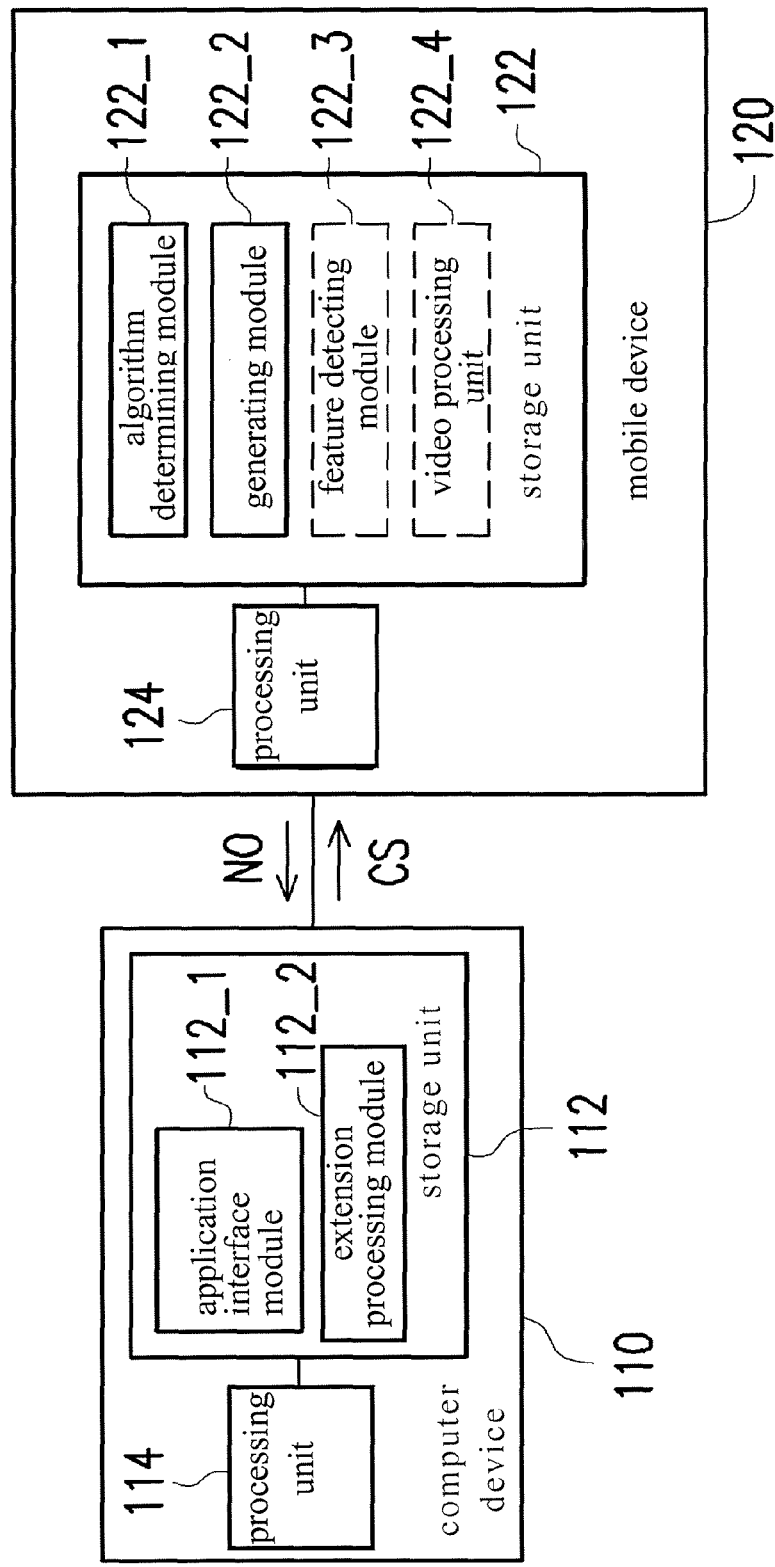
FIG. 1 is a functional block diagram showing a computer device and a mobile device in an embodiment.

FIG. 1 is a functional block diagram showing a computer device and a mobile device in an embodiment. In the embodiment, a computer device 110 is a personal computer, a notebook computer, a workstation or other computers that support image transmission, which is not limited herein. The mobile device 120 includes a camera service platform, such as a smartphone, a tablet computer, a personal digital assistant (PDA) that support image transmission, which is not limited herein.

The computer device 110 includes a storage unit 112 and a processing unit 114. The mobile device 120 includes a storage unit 122 and a processing unit 124. The storage unit 112, 122 are used to stores data, such as a memory, a hard disk drive, which is not limited herein. In an embodiment, the storage unit 112, 122 includes a plurality of modules.

The processing unit 114, 124 are a central processing unit (CPU), a digital signal processing (DSP), a plurality of microprocessors, one or a plurality of microprocessors integrated with a digital signal processor, a controller, a microcontroller, an application specific integrated circuit (ASIC), a field programmable gate array (FPGA), an integrated circuit, a state machine, or a processor of an advanced RISC machine (ARM), which is not limited herein.

In the embodiment, the processing unit 114 of the computer device 110 accesses an application interface module 112_1 and an extension processing module 112_2 stored in the storage unit 112. The processing unit 124 of the mobile device 120 accesses the algorithm determining module 122_1 and the generating module 122_2 stored in the storage unit 122 to execute the steps of an image control method.

Figure 2:
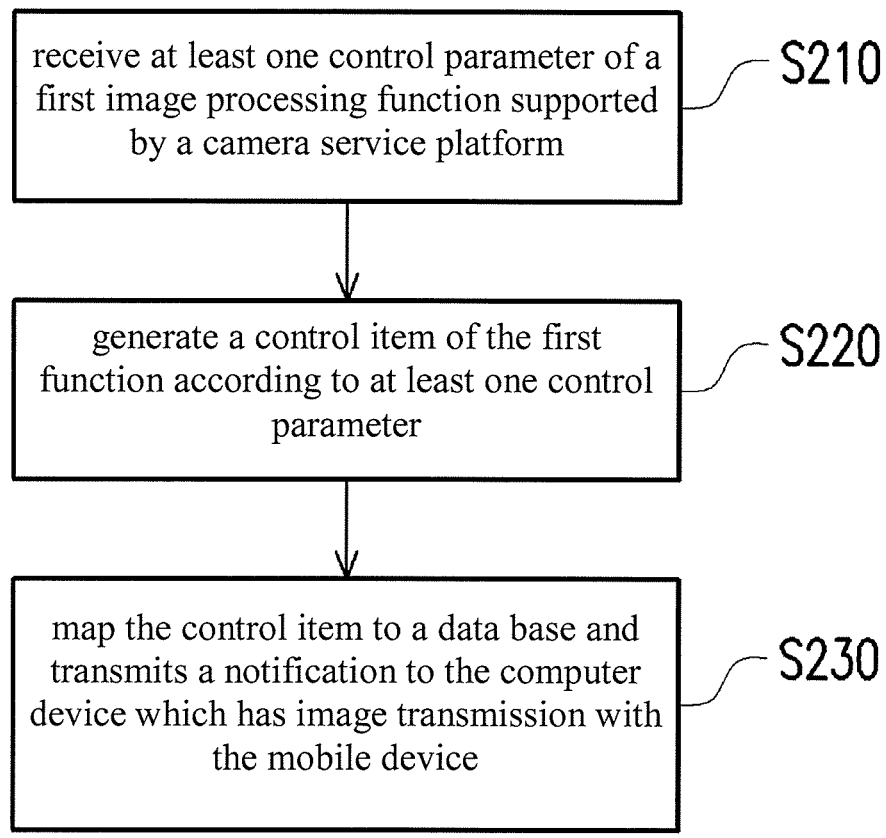
FIG. 2 is a flow chart showing an image control method in an embodiment.

FIG. 2 is a flow chart showing an image control method in an embodiment. The image control method can be executed by the mobile device 120 in FIG. 1, and the steps of the image control method are illustrated in details cooperating with the components in FIG. 1.

In step S210, the algorithm determining module 122_1 receives at least one control parameter of a first image processing function of a camera service platform. The camera service platform is an application of an image/video processing function or a control filters function developed by a vendor or a third party software developer, such as a parameter adjusting function, wherein the parameter is a white balance, an exposure value, a focal distance, photographic sensitivity, which is not limited herein. In an embodiment, the first image processing function is the image processing function of the camera service platform, such as beautify, special effect, time rewind, scene establishing functions, which is not limited herein. The image processing function can be realized by executing the image processing algorithm.

In an embodiment, the control parameter is data used to control the first image processing function, such as a category, a name, a method, an interval, a parameter and a priority, which is not limited herein. The priority, for example, is being earlier in a sequence of executing the first image processing function among a plurality of image processing functions when these image processing functions are applied to process an image simultaneously.

In an embodiment, the first image processing function is named as "time rewind", the control parameter can be expressed as "category: shuttle flying; name: time rewind; method: range; interval: 0.2; parameter: −2 to 1; priority: 6". The priority here represents the execution sequence of the first image processing function is the sixth when the first image processing function and other image processing functions are applied to process an image simultaneously.

In an embodiment, the algorithm determining module 122_1 configures a control path of the first image processing function according to the priority. The control path is corresponding to an execution sequence of the first image processing function and at least one existing image processing function. In an embodiment, the existing image processing function means that the image processing function is already existed in the mobile device 120 before the first image processing function installed in the mobile device 120. In an embodiment, the existing image processing function has a corresponding control path. For example, when the priority of the first image processing function is 2, the control path of the first image processing function is configured after a control path of the existing processing function whose priority is 1. As a result, when the first image processing function and the processing function are applied to an image simultaneously, the mobile device 120 accesses the processing function to process the image according to the control path, and then the mobile device 120 accesses the first image processing function to process the image according to the control path of the first image processing function.

In step S220, the generating module 122_2 generates a control item of the first image processing function according to at least one control parameter. In an embodiment, the control item is data structure including a file descriptor or a statement. For example, when the mobile device 120 and the computer device 110 support UVC, the data structure complies with the UVC protocol. Since each data field corresponding to the control item of the UVC protocol has a specific definition, the mobile device 120 and the computer device 110 can match certain information based on the data structure of the control item. The data field is such as Name, Max, Min, Default and Current, which is not limited herein. In an embodiment, the data structure can adjusts adaptively according to the current used image transmission protocol.

In step S230, the generating module 122_2 maps the control item to a database and transmits a notification NO to the computer device 110 which has image transmission with the mobile device 120. In an embodiment, the notification NO includes a control item event corresponding to the control item. In an embodiment, the database is a storage block of the storage unit 122, and the storage block is used to store the control item corresponding to the first image processing function and the existing image processing functions. In an embodiment, the control item event is the data or the statement for noticing the computer device 110 that a new registered camera service platform arises at the current mobile device 120.

When a new registered camera service platform exists in the mobile device 120, the algorithm determining module 122_1 generates the corresponding control item according to the image processing function, and the control item is stored in the database. Further, the generating module 122_2 transmits the notification NO to the computer device 110 which has image transmission with the mobile device 120, and the generating module 122_2 controls the image processing function of the mobile device 120 via the computer device 110.

After the generating module 122_2 transmits the notification NO to the computer device 110, the computer device 110 generates a control interface corresponding to the first image processing function. Therefore, the first image processing function of editing an image of the mobile device 120 is controlled via the control interface of the computer device 110. The operation after that the computer device 110 receives the notification of the control item is illustrated in the embodiment of FIG. 3.

Figure 3:
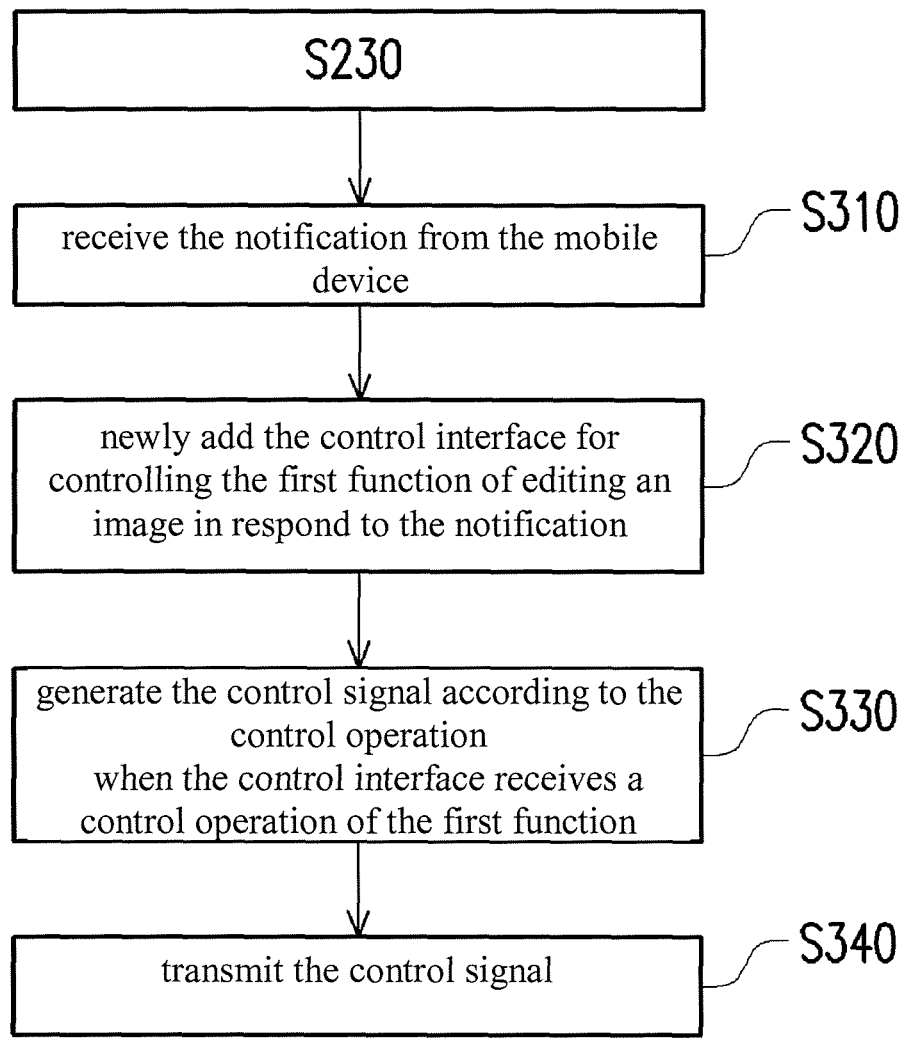
FIG. 3 is a flow chart showing the image control method in FIG. 2.

FIG. 3 is a flow chart showing the image control method in FIG. 2. The image control method in the embodiment can be executed by the computer device 110 in FIG. 1, and the steps of the image control method are illustrated in details cooperating with the components in FIG. 1.

After step S230, the extension processing module 112_2 receives the notification NO from the mobile device 110 in step S310. As stated in the above embodiment, the notification NO is corresponding to the first image processing function of an initial registered camera service platform. In an embodiment, the notification NO includes the control item event corresponding to the control item.

In step S320, the application interface module 112_1 newly adds a control interface for controlling the first image processing function of editing an image in respond to the notification NO. The image, for example, is the image of the mobile device 120 which is edited via the computer device 110, or the image which is stored in the storage unit 122 of the mobile device 120, or the image which is captured by the sensor unit of the mobile device 120, which is not limited herein.

After the extension processing module 112_2 receives the notification NO, the application interface module 112_1 generates the control interface for controlling the first image processing function accordingly. The control interface includes an element corresponding to a control condition, such as a data field, a start key of each control parameter, which is not limited herein. As a result, when the image captured by the mobile device 120 is edited in the computer device 110, the control parameter of the first image processing function can be adjusted at the control interface to edit the image.

In step S330, when the control interface receives a control operation of the first image processing function, the extension processing module 112_2 generates a control signal CS according to the control operation. Furthermore, in step S340, the extension processing module 112_2 transmits the control signal CS.

In an embodiment, the computer device 110 integrates control operations of the first image processing function to be the control signal CS, and the control signal CS is transmitted back to the mobile device 120 to control the mobile device 120, and the image is edited or processed according to the executed control operation. The extension processing module 112_2 makes an adjusted control parameter (an actual control parameter) generate the control signal CS with the data structure the same as that of the control item, and then the mobile device 120 can receive the adjusted control parameter from the control signal CS.

In respond to the control signal CS transmitted from the computer device 110, the mobile device 120 further includes a feature detecting module 112_3 and a video processing unit 112_4 to execute corresponding image processing operations.

Figure 4:
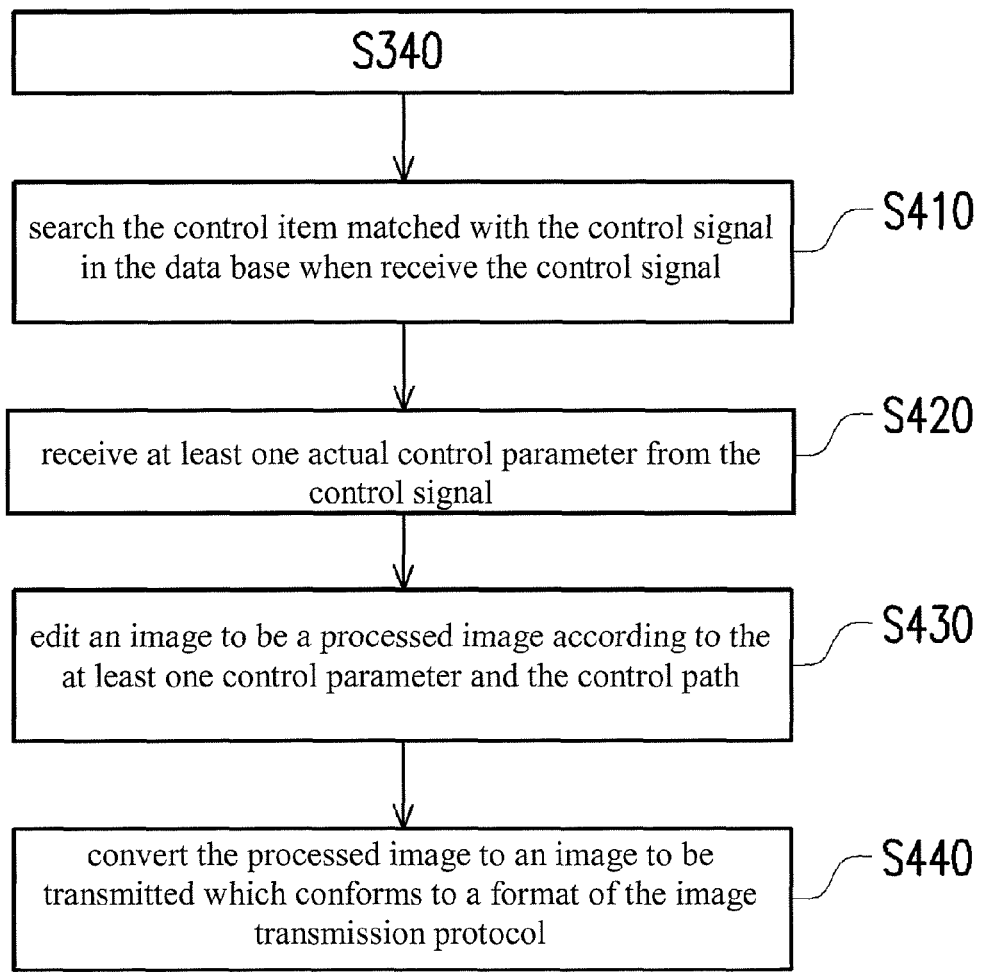
FIG. 4 is a flow chart showing the image control method in FIG. 3.

FIG. 4 is a flow chart showing the image control method in FIG. 3. The image control method in the embodiment can be executed by the mobile device 120 in FIG. 1; the steps of the image control method are illustrated in details cooperating with the components in FIG. 1.

After step S340, in step S410, when the generating module 122_2 receives the control signal CS, the generating module 122_2 searches the control item matched with the control signal CS in the database. When the database has a control item which is corresponding to the same image processing function as that of the control signal CS, the generating module 122_2 defines the control item as a control item matched with the control signal CS, which is not limited herein.

In step S420, the generating module 122_2 receives at least one actual control parameter (an adjusted control parameter) from the control signal CS.

In step S430, the video processing unit 122_4 edits an image to be a processed image according to the at least one control parameter. The image, for example, is the image of the mobile device 120 which is edited via the computer device 110, and image is captured by a feature detecting module 122_3. The image, for example, is the image which is stored in the storage unit 122 of the mobile device 120, or the image is captured by the sensor unit of the mobile device 120, which is not limited herein. Moreover, in step S440, the video processing unit 122_4 converts the processed image to an image to be transmitted which conforms to a format of the image transmission protocol.

In the image control method, the mobile device 120 generates the corresponding control item according to the image processing function of the new registered camera service platform, and the mobile device 120 notifies the computer device 110 of the corresponding control item event. The computer device 110 generates the control interface corresponding to the image processing function according to the control item, and the image processing function is controlled in the computer device 110 to edit the control parameter of an image. The computer device 110 transmits a control operation of an image processing function which is to be executed back to the mobile device 120 to allow the mobile device 120 to edit an image accordingly.

In an embodiment, regardless of the image transmission standard for image transmission between the mobile device 120 and the computer device 110, the method and the mobile device in the embodiments also can be operated under the existing architecture of the image transmission standard accordingly.

Figure 5:
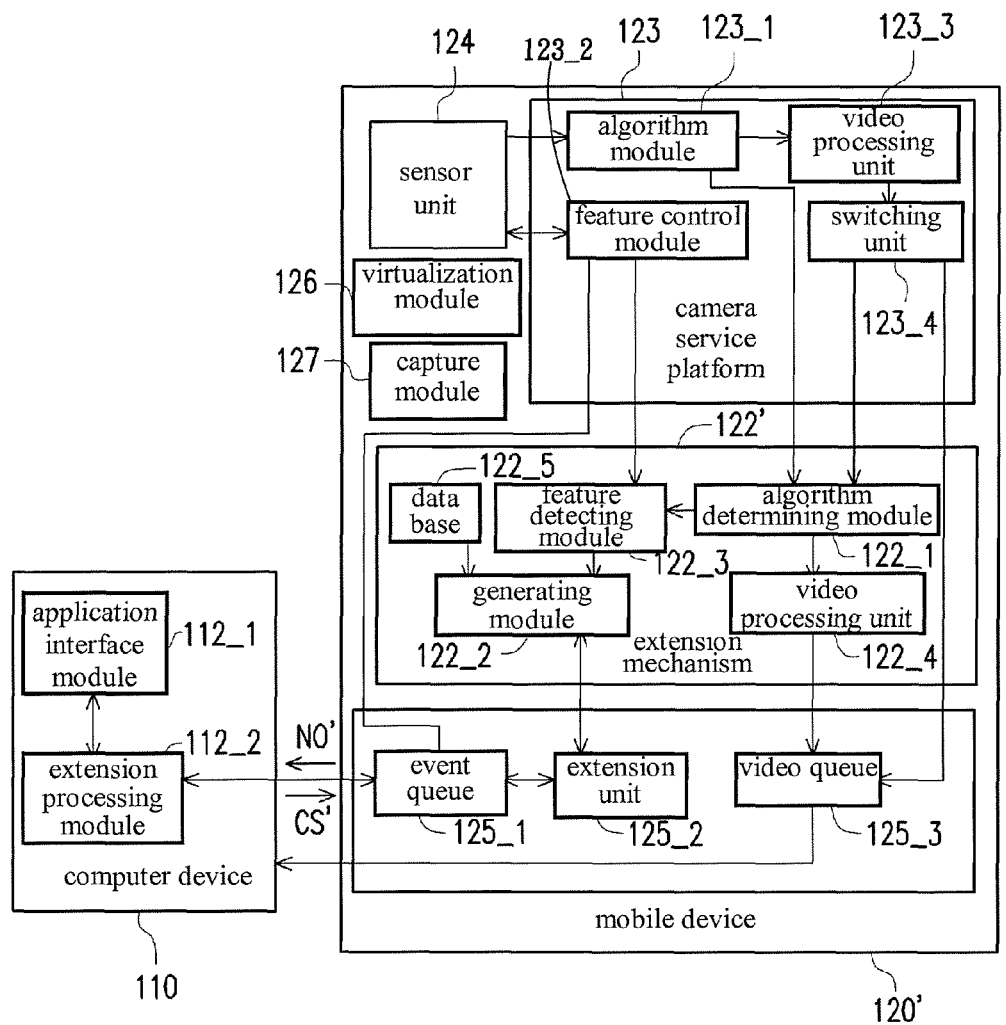
FIG. 5 is a functional block diagram showing a computer device and a mobile device in an embodiment.

FIG. 5 is a functional block diagram showing a computer device and a mobile device in an embodiment. In an embodiment, the framework of the computer device 110 is similar to that of FIG. 1, and the details are omitted herein. The mobile device 120' includes a sensor unit 124 and an extension mechanism 122'. The extension mechanism 122' includes an algorithm determining module 122_1, a generating module 122_2, a feature detecting module 122_3, a video processing unit 122_4 and a database 122_5. A camera service platform 123 registered in the mobile device 120' includes an algorithm module 123_1, a feature control module 123_2, a video processing unit 123_3 and a switching unit 123_4.

In an embodiment, the sensor unit 124 is controlled by an image capture component of a capture module 127, the image capture component, for example, is a charge coupled device (CCD) lens, or a complementary metal oxide semiconductor transistors (CMOS) lens, which is not limited herein. Corresponding to the current used image transmission protocol, the mobile device 120' includes a virtualization module 126' to configure the mobile device 120' corresponding to the current used image transmission protocol. In the embodiment, the UVC protocol is used. The method in the embodiment is also adaptive to other image transmission protocol.

Figure 6:
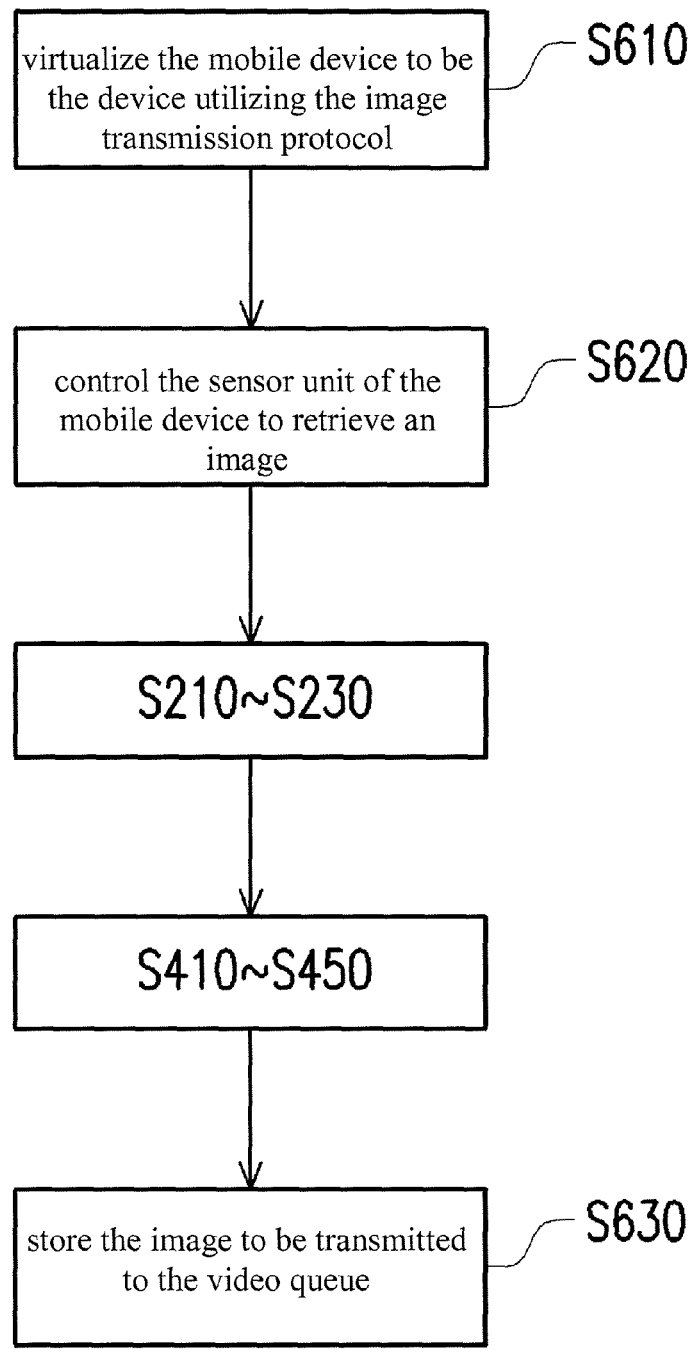
FIG. 6 is a flow chart showing the image control method in FIG. 2 to FIG. 4.

FIG. 6 is a flow chart showing the image control method in FIG. 2 to FIG. 4. The image control method in the embodiment can be executed by a mobile device 120' in FIG. 5; the steps of the image control method are illustrated in details cooperating with the components in FIG. 5.

In step S610, the virtualization module 126 virtualizes the mobile device 120' to be the device utilizing the image transmission protocol. In respond to the current used the UVC protocol, the virtualization module 126 virtualizes the mobile device 120' to be a device utilizing the UVC protocol. Further, the virtualization module 126 establish an event queue (event queue) 125_1, an extension unit (extension unit) 125_2 and a video queue (video queue) 125_3 which are corresponding to the UVC protocol. The virtualization operation of establishing the event queue 125_1, the extension unit 125_2 and the video queue 125_3 by the virtualization module 126 can be regards as that the virtualization module 126 configures the mobile device 120' corresponding to the current used image transmission protocol, which is not limited herein.

In step S620, the capturing module 127 controls the sensor unit 124 of the mobile device 120' to receive an image, or the capturing module 127 receives an image from the storage unit 122 of the mobile device 120'. Then, the modules of the extension mechanism 122' execute the steps S210 to S230 according to the embodiment in FIG. 2.

When the camera service platform 123 is registered in the mobile device 120', the algorithm determining module 122_1 receives the first image processing function from the algorithm module 123_1. Then, the generating module 122_2 generates the control item corresponding to the first image processing function, and the control item is mapped to the database 122_5, and the notification NO' of the control item event corresponding to the control item is transmitted via the extension unit 125_2 and the event queue 125_1. In the embodiment, the extension unit 125_2 converts the notification NO' to an instruction format conforming to the UVC standard, and the converted notification NO' is transmitted to the computer device 110 via the event queue 125_1.

The operations of the computer device 110 in respond to the notification NO' can refer to the embodiment in FIG. 3, and the details are omitted herein. When the generating module 122_2 receives the control signal CS' via the event queue 125_1 and the extension unit 125_2, the modules of the extension mechanism 122' executes the steps S410 to S440 according to the embodiment in FIG. 4.

After the generating module 122_2 searches out the control item matched with the control signal CS' in the database 122_5, the video processing unit 122_4 controls the image processing function corresponding to the control item according to the actual control parameter of the control signal CS', so as to edit the image to be the processed image. In step S630, the video processing unit 122_4 stores the image to be transmitted to the video queue 125_3, and the video queue 125_3 transmits the image to be transmitted to the computer device 110.

In an embodiment, when the control signal received by the event queue 125_1 is used to control the camera service platform 123 to apply the existing image processing function on the image captured by the sensor unit 124, the generating module 122_2 notifies the feature control module 123_2 via the feature detecting module 122_3, the feature control module 123_2 notifies the sensor unit 124 accordingly. After the sensor unit 124 captures an image according to the control signal, the algorithm module 123_1 cooperates with the video processing unit 123_3 to apply the existing image processing function on the image. The switching unit 123_4 transmits the image generated by the video processing unit 123_3 to the algorithm determining module 122_1. The modules of the extension mechanism 122' executes the steps S410 to S440 and S630 according to the embodiment in FIG. 6.

In an embodiment, when the control signal received by the event queue 125_1 is used to control the camera service platform 123 to apply the existing image processing function on the image captured by the sensor unit 124, the event queue 125_1 notifies the feature control module 123_2, and the feature control module 123_2 notifies the sensor unit 124 accordingly. After the sensor unit 124 captures an image in respond to the control signal, the algorithm module 123_1 cooperates with the video processing unit 123_3 to apply the existing image processing function on the image. The switching unit 123_4 transmits the image generated by the video processing unit 123_3 to the video queue 125_3. The video queue 125_3 transmits the image from the switching unit 123_4 to the computer device 110.

In sum, the image control method and the mobile device can make the image processing function of the new registered camera service platform show as the control item of the data structure which conforms to the image transmission protocol, and then the computer device generates the corresponding control interface according to the control item. Therefore, even when the current used image transmission protocol (such as UVC) does not define a specific function of the image processing function, the computer device can still control the image processing function to edit the image of the mobile device via the control interface.

Although the disclosure has been disclosed with reference to certain preferred embodiments thereof, the disclosure is not for limiting the scope. Persons having ordinary skill in the art may make various modifications and changes without departing from the spirit and the scope of the disclosure. Therefore, the scope of the appended claims should not be limited to the description of the preferred embodiments described above.

What is claimed is:

1. An image control method, applied to a mobile device with a camera service platform, the mobile device complies with an image transmission protocol and establishes an event queue and according to the image transmission protocol, wherein the image control method comprises:
   receiving at least one control parameter of an image processing function of the camera service platform;
   generating a control item of the image processing function according to the control parameter;
   mapping the control item to a database;
   converting a notification comprising the control item to an instruction format complying with the image transmission protocol specification to generate a converted notification; and
   transmitting the converted notification via the event queue to a computer device to transmit an image between the computer device and the mobile device.

2. The image control method according to claim 1, wherein the notification includes a control item event corresponding to the control item to notify the computer device whether the camera service platform is a new registered camera service platform.

3. The image control method according to claim 1, wherein the at least one control parameter includes a priority of the image processing function on the camera service platform, a control path of the image processing function is configured according to the priority, and the control path is corresponding to an execution sequence of the image processing function and at least another image processing function of the mobile device.

4. The image control method according to claim 1, wherein after the step of transmitting the notification including the control item to the computer device to transmit the image between the computer device and the mobile device, the image control method further includes the steps of:
   searching the control item corresponds to a control signal in the database when the mobile device receives the control signal, wherein the control signal is corresponding to a control operation of the image processing function;
   receiving at least one control parameter related to the control operation from the control signal;

editing the image to be a processed image according to the at least one the control parameter and the control path;

converting the processed image to a transmitted image which conforms to a format of the image transmission protocol.

5. The image control method according to claim 3, wherein the step of virtualizing the mobile device to the device utilizing the image transmission protocol further includes a step of:

storing the image to be transmitted to a video queue, and the image to be transmitted is transmitted to the computer device via the video queue.

6. The image control method according to claim 4, wherein the control signal is received via the event queue.

7. A mobile device including a camera service platform, comprising:

a storage unit storing a database; and a processor coupled to the storage unit and configured to:

receive at least one control parameter of an image processing function of the camera service platform;

generate a control item of the image processing function according to the at least one control parameter;

map the control item to the database convert a notification comprising the control item to an instruction format complying with an image transmission protocol specification to generate a converted notification; and transmit the converted notification via an event queue to a computer device to transmit an image between the computer device and the mobile device.

8. The mobile device according to claim 7, wherein the notification includes a control item event corresponding to the control item to notify the computer device whether the camera service platform is a new registered camera service platform.

9. The mobile device according to claim 7, wherein the processor is further configured to:

establish the event queue to virtualize the mobile device to conform the image transmission protocol.

10. The mobile device according to claim 7, wherein the at least one control parameter includes a priority of the image processing function on the camera service platform, and the processor further configures a control path of the image processing function according to the priority, and the control path is corresponding to an execution sequence of the image processing function and at least another image processing function of the mobile device.

11. The mobile device according to claim 7, wherein the processor is further configured to:

receive the control signal, search the control item that corresponds to the control signal in the database, and the control signal is corresponded to a control operation of the image processing function;

receive at least one control parameter related to the control operation from the control signal, and access the image and the image processing function; and edit an image as a processed image according to the at least one the control parameter and the control path, and the processed image is converted to a transmitted image conforming to a format of the image transmission protocol.

12. The mobile device according to claim 11, wherein the processor is further configured to store the transmitted image to a video queue, and the transmitted image is transmitted to the computer device via the video queue.

13. The mobile device according to claim 11, wherein the processor is further configured to receive the control signal via the event queue.

14. A computer device, comprising:

a storage unit; and a processor coupled to the storage unit and configured at least to:

receive a notification which has been converted to an instruction format complying with an image transmission protocol specification and including a control item event, wherein the notification is corresponding to an image processing function of a camera service platform, and the control item event corresponds to a control item that generated according to the image processing function;

control the mage processing function to edit an image in response to the notification; and generate a control signal according to the control operation in response to the control interface receiving the control operation corresponding to the image processing function, wherein the control signal includes at least one control parameter related to the control operation.

* * * * *